(12) United States Patent
Charaudeau et al.

(10) Patent No.: US 6,619,672 B2
(45) Date of Patent: Sep. 16, 2003

(54) SUSPENSION DEVICE HAVING A TRIM CORRECTOR

(75) Inventors: Jean-Jacques Charaudeau, Cottens (CH); Daniel Laurent, Marly (CH); Jean-Louis Linda, La Tour de Treme (CH); Pierre Varenne, Neyruz (CH)

(73) Assignee: Conception et Development Michelin S.A., Givisiez (CH)

( * ) Notice: Subject to any disclaimer, the term of this patent is extended or adjusted under 35 U.S.C. 154(b) by 147 days.

(21) Appl. No.: 09/975,656

(22) Filed: Oct. 11, 2001

(65) Prior Publication Data

US 2002/0089128 A1 Jul. 11, 2002

(30) Foreign Application Priority Data

Oct. 11, 2000 (FR) ............................................. 00 13105

(51) Int. Cl.[7] .............................................. B60G 17/015
(52) U.S. Cl. ............................... 280/5.512; 280/5.506; 280/5.507; 280/5.508; 280/5.515; 701/38
(58) Field of Search .................. 701/37, 38; 280/5.504, 280/5.506, 5.507, 5.508, 5.513, 5.51, 5.512, 5.515

(56) References Cited

U.S. PATENT DOCUMENTS

| | | | |
|---|---|---|---|
| 4,973,078 A | | 11/1990 | Barthelemy et al. |
| 4,981,309 A | | 1/1991 | Froeschle et al. |
| 5,027,048 A | * | 6/1991 | Masrur et al. .............. 315/806 |
| 5,028,073 A | | 7/1991 | Harms et al. |
| 5,060,959 A | | 10/1991 | Davis et al. |
| 5,066,041 A | | 11/1991 | Kindermann et al. |
| 5,071,157 A | * | 12/1991 | Majeed ..................... 280/5.515 |
| 5,091,679 A | | 2/1992 | Murty et al. |
| 5,096,219 A | * | 3/1992 | Hanson et al. ........... 280/5.508 |
| 5,475,596 A | * | 12/1995 | Henry et al. .................. 701/37 |
| 5,719,790 A | | 2/1998 | Lohrenz et al. |
| 5,740,039 A | | 4/1998 | Hirahara et al. |
| 6,032,770 A | * | 3/2000 | Alcone et al. .............. 188/378 |
| 6,113,119 A | | 9/2000 | Laurent et al. |
| 6,161,844 A | | 12/2000 | Charaudeau et al. |
| 6,298,294 B1 | * | 10/2001 | Murata et al. ................ 701/37 |

FOREIGN PATENT DOCUMENTS

| | | |
|---|---|---|
| EP | 0415780 | 3/1991 |
| EP | 0878333 | 5/1998 |
| EP | 0878332 | 11/1998 |
| JP | 7-149130 A | * 6/1995 |
| WO | 9967100 | 12/1999 |

OTHER PUBLICATIONS

U.S. patent application Ser. No. 09/975,635, Charaudeau et al., Suspension Device Having Electric Actuator and Spring in Parallel, filed Oct. 11, 2001.
Search Report for FR 0013105.

* cited by examiner

Primary Examiner—Paul N. Dickson
Assistant Examiner—Ruth Ilan
(74) Attorney, Agent, or Firm—Baker Botts L.L.P.

(57) ABSTRACT

A vehicle suspension device having, for each suspension system, a suspension including a spring and a reversible electric actuator acting in parallel with the spring. The device includes provision for controlling the electric actuators of each of the suspension systems so that they each develop a force having two components: a damping component opposing the deflection speed and a trim correction component, the said trim correction components applying a trim correction torque to the suspended mass.

11 Claims, 3 Drawing Sheets

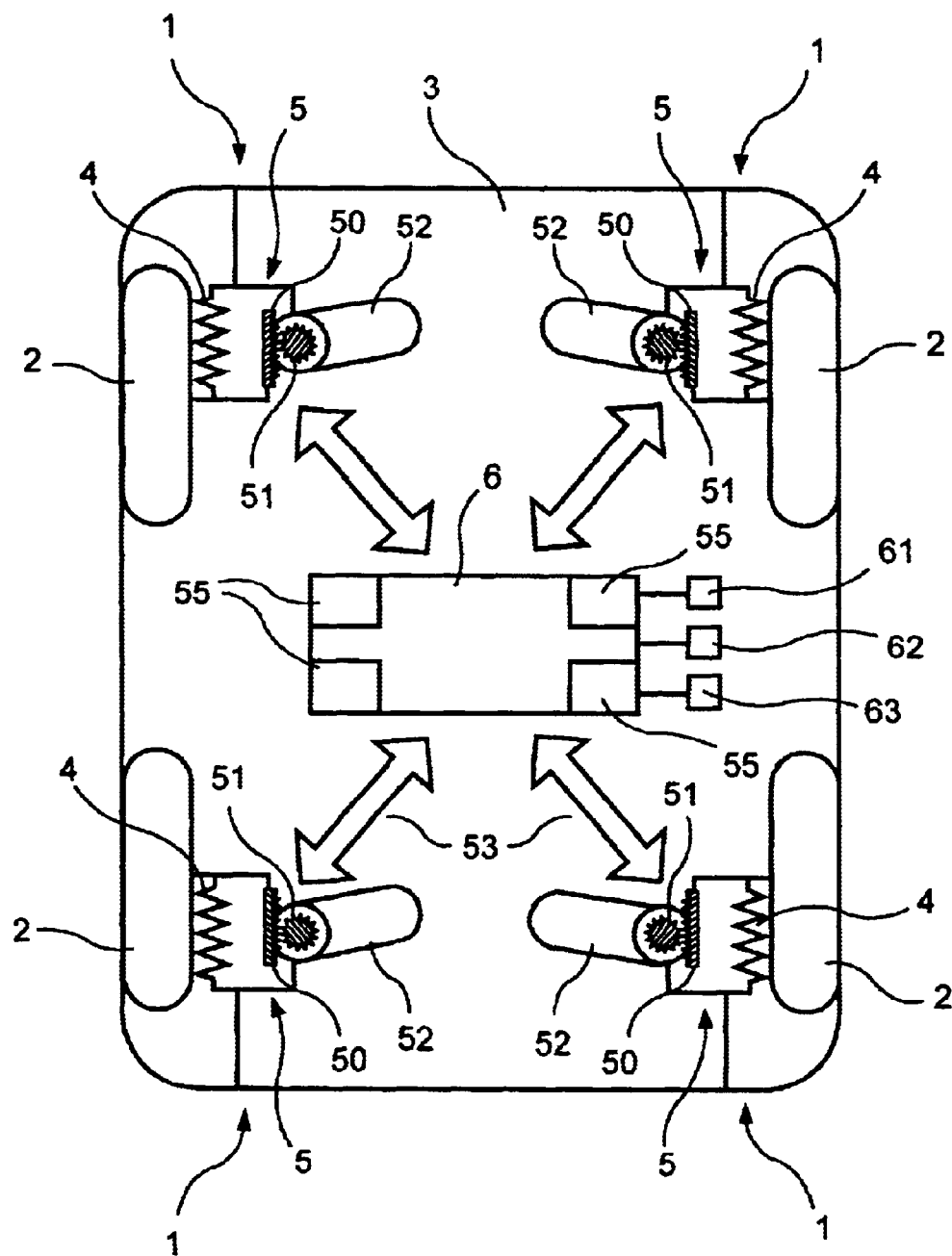
F I G. 2

SUSPENSION DEVICE HAVING A TRIM CORRECTOR

BACKGROUND OF THE INVENTION

The present invention concerns the field of land-vehicle suspensions, and more precisely means used to resist body roll or body pitch. In a particular application, it relates to the suspension of passenger cars.

It is known that the suspension of a vehicle embodies constructional arrangements by means of which the displacement of a wheel or of wheels of an axle with respect to the body (or with respect to the chassis if the vehicle is provided with a chassis, or between body and chassis if appropriate) is guided, and it includes means controlling the deflection of each wheel (a wheel is a member belonging to non-suspended members) with respect to the body (any point situated on the body is referred to as a "suspended" point), in order to bear the load while maintaining a certain ground clearance of the vehicle (this is the function of a spring) and in order to prevent the maintenance of the oscillations arising between suspended and non-suspended points following a disturbance (this is the function of a damper).

It is known that the design of a suspension is characterised by the search for a compromise between objectives which have a reputation for being, at least to a large extent, contradictory: comfort and handling. Numerous efforts have been made to find increasingly favorable compromises. In the state of the art, suspension systems are known which are referred to as active or semi-active suspensions and whose control has now been made possible by progress in electronics. In such suspensions, commands are transmitted by electric or electrohydraulic means in order to modify the flexibility and/or damping characteristics of the suspension in real time. This leads to the addition of an electronic regulation stage, with its sensors and means for calculation, to conventional mechanical, pneumatic or hydraulic devices, as well as solenoid valves or servovalves, in order to transmit the commands for changing the characteristics to the mechanical members responsible for the functioning of the suspension as such. For example, a valve in a damper has to be opened or closed in order to modify the dissipation of energy which it brings about.

In the majority of suspension systems for passenger cars, trucks and passenger-transporting coaches, there also exist specific means for opposing the roll of the body (or chassis) under the effect of centrifugal forces. The tilting of the body about a horizontal axis contained in a longitudinal and vertical plane of symmetry of the vehicle is called "roll". Excessive roll is detrimental to the comfort of the passengers and, depending on the wheel-guiding means used, may even be detrimental to the working of the tires when the camber of the tire with respect to the ground is influenced by the roll of the body. This is typically the case for a double-wishbone suspension, which is widely used in passenger cars. The roll then influences the stresses to which the said tire is subjected and the more or less favorable position in which it is situated for transmitting forces, in particular forces in the transverse direction. It is known that these forces are of prime importance for the guidance of the vehicle, and thus for safety.

The most commonly employed means for opposing this roll consists in using an anti-roll bar, in general one anti-roll bar per axle. Unfortunately, an anti-roll bar can only limit the roll by opposing the latter with a reaction torque. On principle, it cannot prevent the roll, and thus it cannot prevent the tilting of the wheels in a direction unfavorable to the correct functioning of the tires. In addition, it is known that an anti-roll bar needlessly stiffens the suspension in a straight line, since it opposes the non-identical suspension deflections of the wheels of an axle connected by such a bar. It is only in a pure vertical deflection that the anti-roll bar does not intervene.

From the patent application WO 99/67100, a proposal is already known which describes an active roll control, produced by means of an anti-roll bar comprising an electric motor intended to impose thereon a pre-tension in the desired direction. However, this solution is limited to the control of the roll.

The pitch of a vehicle (lift at the front on acceleration, diving on braking) poses problems comparable to those posed by roll. The pitch is generally opposed by suspension configurations adapted so that the longitudinal transfers of loads only partially stress the springs, but this is a palliative not without detrimental effects. The roll and pitch are both referred to hereinbelow as "trim variation". A trim variation embraces, in the present specification, a variation of the ground clearance and also any tilting with respect to the a reference plane linked to the non-suspended mass of the vehicle.

Also known are numerous proposals for active suspensions, such as those described in the patents or patent applications U.S. Pat. Nos. 5,060,959, 5,028,073, 5,066,041, 5,740,039 or EP 0 878 333, to mention only some of them. The diversity of the constructional arrangements and of the control laws proposed compared with the very small number of active suspensions on the market gives an idea of the difficulty of controlling the suspensions effectively. The state of the art comes up against the choice of control parameters, and the correct utilization of a multitude of signals which are thought to be needed for correctly capturing the attitude of a vehicle.

SUMMARY OF THE INVENTION

The aim of the invention is to obtain a high level of operational safety of the vehicles and great comfort.

The invention proposes a vehicle suspension device comprising at least two suspension systems each connecting a non-suspended mass comprising a wheel to a suspended mass with possible vertical deflection, each suspension system comprising a vertical suspension reacting to the variations of distance between the suspended mass and the non-suspended mass, the said vertical suspension comprising a spring and a reversible electric actuator acting in parallel with the spring, the device comprising means for evaluating a non-vertical stress applied to the suspended mass and likely to bring about a trim variation of the suspended mass, the said device comprising means for controlling the electric actuators of each of the said suspension systems so that they each develop a force consisting of the addition of two components: a damping component opposing the deflection speed and a trim correction component, the said trim correction components applying a trim correction to the suspended mass.

Thus, through the simple programming of the mere two components indicated above, one of which is a dissipative damping component, it is possible to control the force in the electric actuator so as to obtain a safe and relatively comfortable suspension. The present proposal does not have recourse to more complex means as proposed in the patent application EP 0 878 333, in which a road-contour-following control is proposed, accompanied in one embodiment by a detection of the occurrence of a resonance of the tire in order to introduce a damping.

An advantageous example of the use of the invention concerns a trim correction controlled by means for evaluating a non-vertical stress applied to the suspended mass and likely to bring about a trim variation of the suspended mass. The rest of the description concerns essentially roll, since this is sufficient to make the invention clear. The said at least two suspension systems form an axle and are mounted on either side of the median plane of symmetry of the vehicle, so that the said trim correction torque opposes the roll. However, this is not limiting. All that has been said in connection with roll may be developed in connection with pitch. The invention can be applied to a bicycle such as a motorcycle. The proposed means can be used to oppose either or both of these phenomena. The invention thus extends to the case in which the said at least two suspension systems comprise a front suspension system and a rear suspension system, so that the said trim correction torque opposes the pitch, and in particular to the case in which the vehicle has at least four suspension systems forming a front axle and a rear axle, in which the said trim correction torque opposes both the roll and the pitch.

Of course, if both the roll and the pitch are compensated, each of the said suspension systems is capable of receiving from the means for controlling the electric actuators a force value which is the resultant of a contribution for the correction of the roll and of a contribution for the correction of the pitch. For each electric actuator, the overall trim correction component is the algebraic sum of a contribution relating to the roll and a contribution relating to the pitch. In the case of pure roll (no pitch) or pure pitch (no roll), the correction components are equal absolute values and are oriented in opposite directions to one another on either side of the vehicle, that is to say on the left-hand side and on the right-hand side as far as the roll is concerned, and at the front and rear as far as the pitch is concerned.

The invention proposes an approach which, having observed that the control of the roll is the determining factor both for the feeling of comfort and safety experienced by the passengers and for the correct functioning of the tires, uses a spring (mechanical or pneumatic) and a reversible electric actuator acting in parallel with the spring as elements for controlling the deflection of a suspension system. The electric actuators of certain suspension systems, and preferably of all the suspension systems of the vehicle, are controlled so as to compensate at least partially the roll or the pitch, while providing the possibility of introducing a variable damping. In addition, it should be pointed out that it may be advantageous to overcompensate either of the trim variation phenomena. It is possible, for example, to overcompensate roll on a bend, that is to say bring about a tilting of the body towards the inside of the bend, if only by a fairly limited angle.

According to a preferred embodiment, the invention uses a conventional spring, for example a helical spring, which is dimensioned and arranged to bear the static load of a vehicle and provide a predetermined ground clearance. The value of its flexibility according to the deflection is constant or variable.

It is known that, in the case of very flexible suspensions designed to promote comfort, generally considerable roll and pitch are experienced which very often bring the suspensions into an operating area close to a deflection stop. In the prior art, these undesirable phenomena were opposed by acting on the suspension geometry to oppose the pitch and by using anti-roll bars. Here, in contrast, these phenomena are opposed by assisting the spring of each suspension system in an appropriate manner. This makes it possible to use springs of much greater flexibility without encountering disadvantages inherent in suspensions which are too flexible.

It has been indicated above that the control of the trim can also include the control of the ground clearance, for example in order to obtain a constant ground clearance irrespective of the static load of the vehicle. As already indicated in the patent application EP 0 878 333, to make a height correction it must be accepted that energy is continuously consumed in order that the fraction of the load exceeding the dead weight of the vehicle is borne by the electric actuator. The reason is that this assumes that a fraction of the trim correction component continuously opposes the said load exceeding the dead weight, which is not incompatible with the principle according to the invention, but requires the establishment of a constant current component in the electric actuators. However, it seems preferable to do without height correction, or to reserve the height correction function for a device other than the electric actuator, this other device acting with a great time constant and consuming energy only during the correction phase.

The invention will be better understood from the following description of an example given on a non-limiting basis, with reference to the appended drawings.

DESCRIPTION OF THE DRAWINGS

FIG. 2 is a diagram showing the layout of the main elements of the invention on a vehicle.

DETAILED DESCRIPTION OF THE INVENTION

Figure 1:
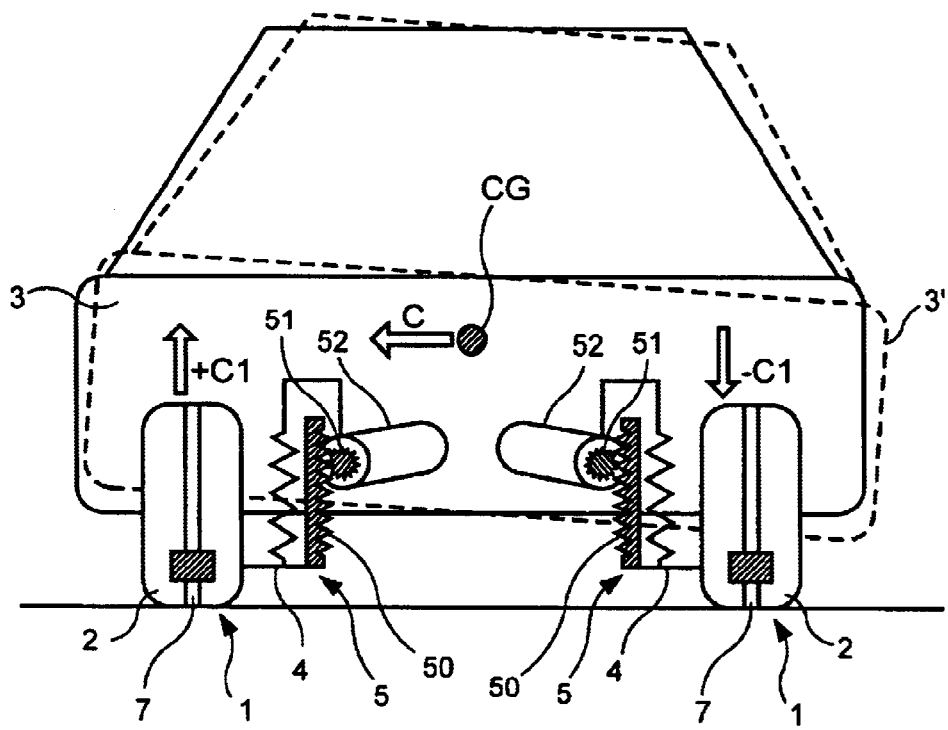
FIG. 1 shows a vehicle equipped with a suspension according to the invention.

In FIG. 1 there can be seen in front elevation a four-wheeled passenger car equipped with elastic links 1 mounted between the wheels 2, forming part of the non-suspended mass, and the body 3. The four elastic links 1 mounted between the wheels 2 and the body 3 of the vehicle can be seen in FIG. 2. Each elastic link comprises a vertical guide slot 7, a helical spring 4 and an electric actuator 5 which is mounted in parallel. The electric actuator 5 comprises a rack 50 fixed to the non-suspended part of the suspension system. An electric motor 52 is fixed by its frame to the suspended part of the suspension system. A pinion 51 is mounted on the rotor of the motor and is engaged with the rack 50. For more details on a possible construction comprising guidance of the wheel plane by a vertical guide slot 7, reference should be made to the patent application EP 0 878 332. Of course, other principles used for linking a tire and wheel assembly to a body may be adopted and are compatible with the use of an electric actuator and a spring which are mounted in parallel.

The body 3 represented in continuous lines is not subjected to roll. This is its natural attitude when travelling in a straight line. Note that the center of roll of the body is situated below the center of gravity CG for such a suspension. If a centrifugal force C acting at the center of gravity CG occurs, outside any active correction, the body will tilt towards the outside of the bend by an angle of roll dependent on the centrifugal force and the flexibility of the suspensions (not shown).

The suspension device according to the invention comprises means for evaluating such a stress which is not vertical and oriented parallel to the straight line joining the centers of the areas of contact on the ground of the wheels under consideration, here belonging to an axle since the case being explained is that of roll. This phenomenon is opposed by developing in the electric actuators 5 a correction component $+C_1$ at the outside of the bend and $-C_1$ at the inside of the bend. By acting on the amplitude of this correction, it is possible to limit the angle of roll, or even to overcompensate it as shown by the body 3' represented in broken lines in FIG. 1.

It is known that, in order to obtain a given force in an electric actuator 5 as described above, the motor must develop a specific torque. The control in order to obtain a specific force in the electric actuator 5 thus amounts to controlling the torque of the motor. To this end, for each suspension system, an individual control is provided by a control unit 55 making it possible to create a force in the said electric actuator 5 having at least a damping component opposing the deflection movement (the functioning of which will be explained hereinbelow) and a trim correction component, other than zero when necessary. The control of the trim correction components is centralized since it concerns the equilibrium of the vehicle as a whole. It is provided by a central unit 6. Preferably, for a vehicle with at least four wheels, the central unit 6 provides at least a correction of the roll. Advantageously, the central unit 6 can provide or additionally provide a correction of the pitch of the vehicle.

Continuing with the example of roll, the roll correction components are equal absolute values and are oriented in opposite directions to one another in each axle so as to apply an anti-roll torque to the body 3. The roll can be compensated partially (less energy needed), or totally (better comfort, better functioning of the tires), or may even be overcompensated as mentioned above, in order to improve more radically still the operation of a vehicle such as a four-wheeled passenger car. The greater the compensation, the more it is necessary to be able to develop a large torque in the motors 52, and to maintain it for the time which the transverse (or longitudinal) stresses last, the latter being much longer than the stresses resulting from the bumpy nature of the road, calling for the damping component, which will be discussed hereinbelow.

To this end, it is possible to use sensors 61, 62, 63 such as, for example, accelerometers connected to the body to evaluate a non-vertical stress. The stress may be the transverse acceleration and/or the yaw rate (resulting in roll). It is also possible to evaluate the longitudinal acceleration (resulting in pitch). This or these evaluations make it possible to develop an appropriate trim correction torque or appropriate trim correction torques.

As a variant, it is possible to use sensors for evaluating parameters indicating vehicle driving conditions. These are, for example, a sensor for the angle of the steering wheel, the brake pressure, the action on the accelerator, and a vehicle speed sensor. This may make it possible to anticipate the instant at which accelerations parallel to the ground (transverse, longitudinal acceleration) occur. In this case, it is possible to use control strategies observing those of the driver's actions, estimating the probable consequences on the roll (and on the pitch), and the appropriate trim correction is determined.

It is of course possible to bring about a variation of the trim of the suspended mass in response to any type of command. For example, even in the absence of longitudinal acceleration applied to the body, the control means can be controlled so that a torque overcompensating a transverse acceleration is accompanied by a slight voluntary dive of the vehicle. This example is cited only to make it clear that an infinite number of active controls are possible.

Advantageously, the invention also makes it possible to control the distribution between the front axle and the rear axle of the said roll correction components in real time and very easily. Given an overall anti-roll torque acting on the body, the greater the roll correction share achieved by the rear axle, the more the vehicle will oversteer, and vice versa. The yaw inertia of the vehicle, for example at the start of a bend, can be overcome by very briefly adopting a greater anti-roll share at the rear, and then the path of the vehicle can be stabilized by giving it a more understeering handling by an anti-roll share becoming greater at the front. By comparing the path of the vehicle desired by the driver with the effective path of the vehicle, in the manner of the stabilising devices known under the designation "ESP", a stabilizing effect can be obtained by acting dynamically on the distribution of the roll correction torque between the front and the rear of the vehicle. Similarly, the pitch correction of a body of a 4-wheeled passenger car depends on an overall pitch correction torque, and the correction components acting on the pitch can be distributed on either side of the plane of symmetry of the vehicle, if appropriate by a real-time control.

The damping component will now be discussed. The aim of this is to prevent the maintenance of oscillations of the suspension. It is thus advisable to observe, individually for each wheel, the deflection of the suspension. In a very particularly advantageous variant, a Permanent Magnet Synchronous Motor 52 (PMSM) is used. This type of motor comprises, owing to its construction, rotor position sensors used to control the motor. They can be used to measure the variation of the distance between the wheel 2 and the body 3. The information coming from the sensors inside the motor reaches a unit 55 for the individual control of the wheel, via a channel 53, thereby permitting the torque control of the motor 52. The unit 55 comprises electronic means for utilizing the information coming from the sensors inside the motor so as to provide suitable damping. Of course, it would also be possible to use sensors outside the electric motor 52 to control the damping.

Figure 3:
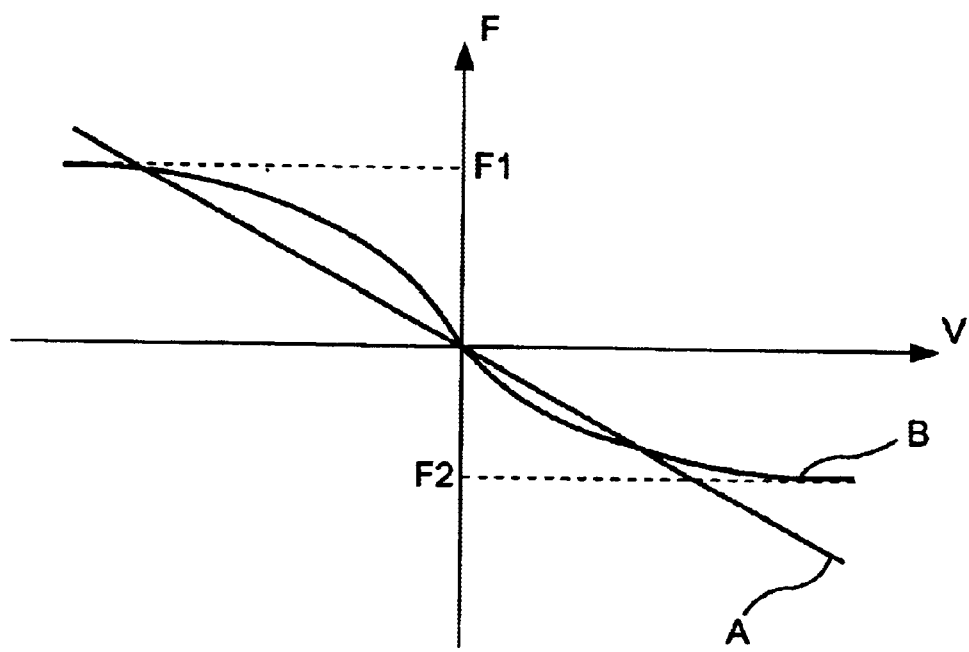
FIG. 3 is a diagram giving two examples of the damping law.

It is possible to introduce an appropriate damping law into the unit 55 for the individual control of the wheel. In FIG. 3, there can be seen a linear law A in which the damping component F developed by the electric actuator 5 is proportional to the speed V of the vertical deflection of the wheel 2 with respect to the body 3 (and a function of its sign). There can also be seen another law B in which the damping component F is a non-proportional function of the speed V (and a function of its sign), reaching thresholds $F_1$ and $F_2$, and that the thresholds are not the same in compression and in relaxation. It is often difficult to produce a desirable damping law such as the law B with the conventional hydraulic dampers. In the case of the present invention, the control of the electric actuators 5 can be programmed according to any law without particular difficulty, provided that a force which opposes the movement is developed.

It is also possible to adapt the damping component F in accordance with parameters indicating vehicle driving conditions. For example, the damping component F increases with the increasing speed of the vehicle. For example, the damping component F takes account of the historical observations on the driving of the vehicle: the damping component F increases with the sporty driving of the driver, manifested by rapid variations of stresses on the brakes, the accelerator and when steering. The damping component F can also be chosen by the driver at the vehicle dashboard.

The unit 55 continuously recalculates the said force F to be exerted, in accordance with a predetermined sampling period (for example every millisecond), in order to develop the damping component, in order to develop the trim correction component taking account, of course, of the trim correction requests coming from the central unit 6.

It should be noted, in passing, that the pitch correction contribution can also be based on certain characteristic observations of the driven vehicle, mentioned in connection with damping: brake pressure and/or rate of increase of the brake pressure, degree and/or rate of depression of the accelerator pedal.

It should be pointed out finally that it is, of course, desirable for each electric actuator to be able to function in fail mode, in the event of a breakdown of any of the units 55 and/or of the central unit 6. In this case, the supply terminals of the armature of the motor 52 are connected, for example in a short-circuit or to a resistor of adequate dissipation, which causes the motor 52 to function as a generator, with dissipation of energy by the Joule effect due to the circulation of a current.

We claim:

1. A vehicle suspension device having at least two suspension systems, each connecting a non-suspended mass comprising a wheel to a suspended mass, with possible vertical deflection, each suspension system comprising a vertical suspension reacting to the variations of distance between the suspended mass and the non-suspended mass, the said vertical suspension comprising a spring and a reversible electric actuator acting in parallel with the spring, the device comprising means for controlling a trim correction, the device comprising means for controlling the electric actuators of each of the said suspension systems so that they each develop a force made up of the addition of two components: a damping component opposing the deflection speed and a trim correction component, the said trim correction components applying a trim correction to the suspended mass.

2. A device according to claim 1, in which the means for controlling a trim correction comprise means for evaluating a non-vertical stress applied to the suspended mass and likely to bring about a trim variation of the suspended mass, and in that the said trim correction components apply a trim correction torque to the suspended mass.

3. A device according to claim 2, in which the said at least two suspension systems form an axle, the said suspension systems being mounted on either side of the median plane of symmetry of the vehicle, so that the said trim correction torque opposes the roll.

4. A device according to claim 2, in which the said at least two suspension systems comprise a front suspension system and a rear suspension system, so that the said trim correction torque opposes pitch.

5. A device according to claim 2, for a vehicle comprising at least four suspension systems forming a front axle and a rear axle, in which the said trim correction torque opposes both roll and pitch.

6. A device according to claim 1, in which the damping component is controlled in accordance with parameters indicating vehicle driving conditions.

7. A device according to claim 1, in which the electric actuator comprises a Permanent Magnet Synchronous Motor.

8. A device according to claim 7, in which the control means determine the variation of the relative position between suspended point and non-suspended point entirely from a measurement of the variation of position delivered by sensors integrated in the electric motor.

9. A device according to claim 1, including means for evaluating a non-vertical stress comprising at least one sensor chosen from the group consisting essentially of a sensor for the transverse acceleration of the said suspended mass, a yaw rate sensor, and a sensor for the longitudinal acceleration of the said suspended mass.

10. A device according to claim 1, for a vehicle comprising at least one front axle and one rear axle each having two suspension systems mounted on either side of the median plane of symmetry of the vehicle, the said control means controlling the distribution between the front axle and the rear axle of the said trim correction components opposing the roll in real time.

11. A device according to claim 1, for a vehicle comprising at least one front axle and one rear axle, each having two suspension systems mounted on either side of the median plane of symmetry of the vehicle, the said control means controlling the distribution on either side of the median plane of symmetry of the vehicle of the said correction components acting on the pitch in real time.

* * * * *